(12) United States Patent
Miller et al.

(10) Patent No.: US 12,252,047 B2
(45) Date of Patent: Mar. 18, 2025

(54) BACK PAD ASSEMBLY FOR A MATERIAL HANDLING VEHICLE

(71) Applicant: The Raymond Corporation, Greene, NY (US)

(72) Inventors: Daniel B. Miller, Greene, NY (US); Gregory W. Smiley, Greene, NY (US); Joseph T. Yahner, Chenango Forks, NY (US); Kurt R. Lutz, Greene, NY (US); Kurt R. Werner, Auburn, NY (US); Michael W. Konieczny, Skaneateles, NY (US); Frank J. Witkowski, III, Syracuse, NY (US); Howard Scott Ryan, Skaneateles, NY (US)

(73) Assignee: The Raymond Corporation, Greene, NY (US)

( * ) Notice: Subject to any disclaimer, the term of this patent is extended or adjusted under 35 U.S.C. 154(b) by 295 days.

(21) Appl. No.: 17/838,528

(22) Filed: Jun. 13, 2022

(65) Prior Publication Data

US 2022/0396188 A1 Dec. 15, 2022

Related U.S. Application Data

(60) Provisional application No. 63/209,863, filed on Jun. 11, 2021.

(51) Int. Cl.
*B60N 2/00* (2006.01)
*B60N 2/64* (2006.01)

(52) U.S. Cl.
CPC ..................... *B60N 2/64* (2013.01)

(58) Field of Classification Search
CPC ........... B60N 2/64; B60N 2/646; B60N 2/643
See application file for complete search history.

(56) References Cited

U.S. PATENT DOCUMENTS 4,572,578 A * 2/1986 Perkins ..................... A47C 7/46
297/452.32
4,834,455 A 5/1989 Proctor
(Continued)

FOREIGN PATENT DOCUMENTS

CN 212243648 U 12/2020
EP 2518004 A1 10/2012
(Continued)

OTHER PUBLICATIONS

Grainger, Grainer Approved Premium Forklift Seat: 60°, Retrieved from https://www.grainger.com/product/19ND82?gucid=N:N:FPL:Free:GGL:CSM-1946:tew63h6:20501231, Copyright 1994-2023 W.W. Grainger, Inc., 2 pages.
(Continued)

*Primary Examiner* — Steven O Douglas
(74) *Attorney, Agent, or Firm* — Quarles & Brady LLP

(57) ABSTRACT

A back pad assembly for a material handling vehicle is provided that includes a back pad, a framework, and a mounting frame. The back pad includes a center portion, a first side portion, and a second side portion. The first side portion defines a first curved profile, and the second side portion defines a second curved profile. The first curved profile and the second curved profile are arranged on laterally-opposing sides of the center portion. The framework includes a first mounting bar and a second mounting bar. The framework is coupled to the back pad. The first and second mounting bars are adjustably supported by the mounting frame to enable the back pad to be selectively mounted at varying heights along the mounting frame.

20 Claims, 17 Drawing Sheets

(56) References Cited

U.S. PATENT DOCUMENTS

| | | | |
|---|---|---|---|
| 5,344,211 A * | 9/1994 | Adat | A47C 7/42 297/284.7 |
| 6,102,481 A | 8/2000 | Tateyama | |
| 6,129,419 A * | 10/2000 | Neale | B60N 2/58 297/284.6 |
| 6,182,778 B1 * | 2/2001 | Henshaw | B66F 9/07545 187/222 |
| 6,189,964 B1 | 2/2001 | Henshaw et al. | |
| D537,226 S | 2/2007 | Niebuhr | |
| D544,174 S | 6/2007 | Quinlan, Jr. et al. | |
| 7,461,885 B2 | 12/2008 | Mochizuki et al. | |
| D608,522 S | 1/2010 | Berger et al. | |
| D618,945 S | 7/2010 | Tanaka | |
| 7,793,979 B2 | 9/2010 | Kraimer et al. | |
| 7,914,078 B2 | 3/2011 | Hentges | |
| 8,528,699 B2 | 9/2013 | Eckersley | |
| D717,514 S | 11/2014 | Miggels et al. | |
| 8,905,183 B2 | 12/2014 | Warner et al. | |
| 9,096,151 B2 | 8/2015 | Canonge et al. | |
| D756,589 S | 5/2016 | Knie | |
| D790,238 S | 6/2017 | Little et al. | |
| D790,255 S | 6/2017 | Mi | |
| D793,770 S | 8/2017 | Krishtul | |
| D805,323 S | 12/2017 | Chan | |
| D846,325 S | 4/2019 | Tsai | |
| D903,351 S | 12/2020 | Zhou | |
| D913,024 S | 3/2021 | Su | |
| D915,104 S | 4/2021 | Yang | |
| D925,672 S | 7/2021 | Chong | |
| 11,191,363 B2 | 12/2021 | Gleason et al. | |
| D972,336 S | 12/2022 | Grant et al. | |
| D976,614 S | 1/2023 | Dowd | |
| D980,648 S | 3/2023 | Shen | |
| D985,876 S | 5/2023 | Smiley et al. | |
| D994,408 S | 8/2023 | Zhao | |
| 2010/0102609 A1 | 4/2010 | Confer et al. | |
| 2014/0114530 A1 | 4/2014 | Fitch et al. | |
| 2017/0347803 A1 | 12/2017 | Krishtul | |
| 2022/0053948 A1 | 2/2022 | Beeftink et al. | |
| 2023/0133956 A1 | 5/2023 | Root | |

FOREIGN PATENT DOCUMENTS

| | | |
|---|---|---|
| EP | 3006390 A1 | 4/2016 |
| FR | 2928612 A1 | 9/2009 |
| WO | 9910271 A1 | 3/1999 |

OTHER PUBLICATIONS

Lift, Toyota Center-Controlled Rider Pallet Jack, Retrieved from https://www.liftincorporated.com/catalog/forklifts/electric-pallet-trucks/center-controlled-rider-pallet-jack, Copyright 2022 Lift, Inc., 1 page.

Raymond, Side Entry Pallet Truck, Retrieved from https://www.raymondcorp.com/forklifts/electric-pallet-jack/8810-side-entry-pallet-truck, Copyright 2023 The Raymond Corporation, 37 pages.

European Patent Office, Extended Search Report, Application No. 22178597.5, Nov. 2, 2022, 10 pages.

* cited by examiner

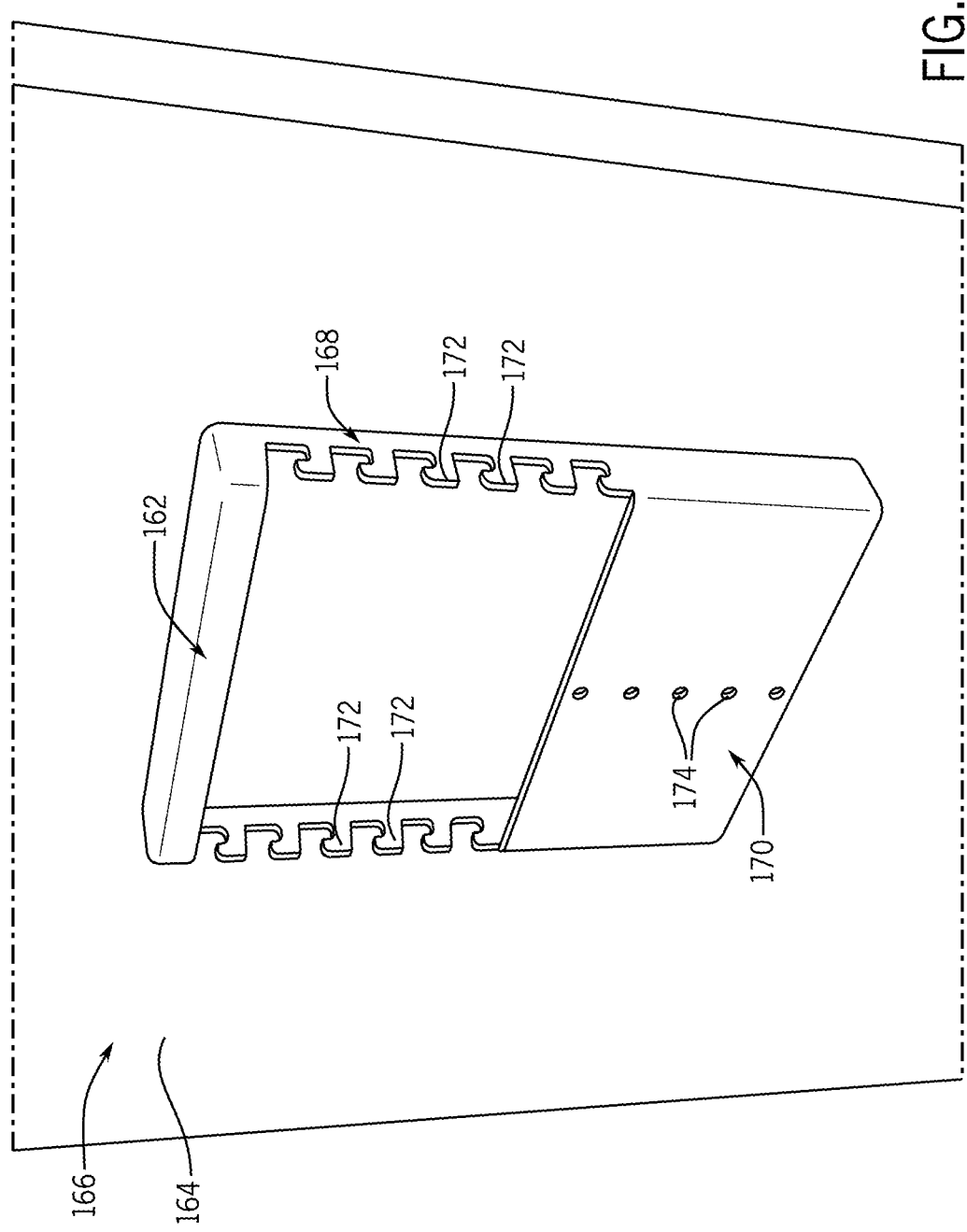

BACK PAD ASSEMBLY FOR A MATERIAL HANDLING VEHICLE

CROSS-REFERENCES TO RELATED APPLICATIONS

This application claims priority to U.S. Provisional Patent Application No. 63/209,863, titled "Back Pad Assembly for a Material Handling Vehicle" and filed Jun. 11, 2021, the entirety of which is incorporated herein by reference.

STATEMENT REGARDING FEDERALLY SPONSORED RESEARCH

Not Applicable.

BACKGROUND

Material handling vehicles can be used to transport goods in an environment, for example, a warehouse.

BRIEF SUMMARY

Aspects of the present disclosure generally relate to a back pad assembly for a material handling vehicle that includes a back pad, a framework, and a mounting frame. The back pad includes a center portion, a first side portion, and a second side portion. The first side portion defines a first curved profile and the second side portion defines a second curved profile. The first curved profile and the second curved profile are arranged on laterally-opposing sides of the center portion. The framework includes a first mounting bar and a second mounting bar. The framework is coupled to the back pad. The first and second mounting bars are adjustably supported by the mounting frame to enable the back pad to be selectively mounted at varying heights along the mounting frame.

In another aspect, a material handling vehicle includes an operator compartment that defines an active zone with a perimeter, a back rest, and a back pad. The back pad includes a first and second side portion with generally curved profiles arranged on laterally-opposing sides of a center portion. The center portion protrudes from the back pad toward a control handle of the material handling vehicle. The first side of the perimeter defines a first vertical plane that intersects a first edge of the first side portion. The second side of the perimeter defines a second vertical plane that intersects a second outer edge of the second side portion.

In still another aspect, a material handling vehicle includes a back pad. The back pad includes a center surface, a first lateral surface, and a second lateral surface. The first lateral surface and the second lateral surface are disposed on laterally opposing sides of the center surface. The material handling vehicle further includes a first handle coupled to a first side of the back pad and defining a first handle surface, and a second handle coupled to a second side of the back pad and defining a second handle surface. The first lateral surface and the first handle surface combine to define a first curved portion of the back pad. The second lateral surface and the second handle surface combine to define a second curved portion of the back pad.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

FIG. 7 is a top, front, left isometric view of a mounting frame attached to a material handling vehicle according to an aspect of the present disclosure.

DETAILED DESCRIPTION

Figure 1:
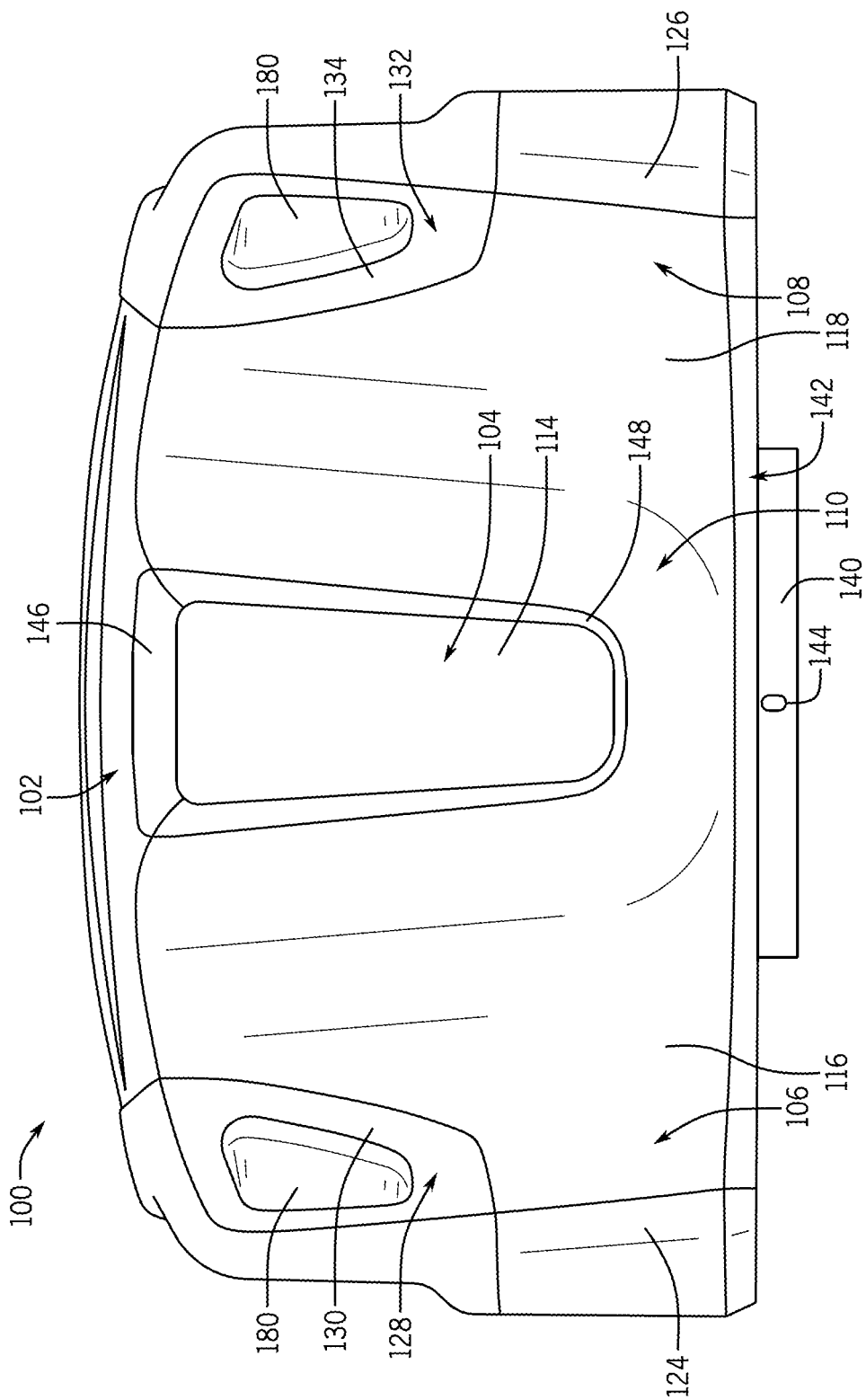
FIG. 1 is a front view of a back pad assembly according to an aspect of the present disclosure.
Figure 2:
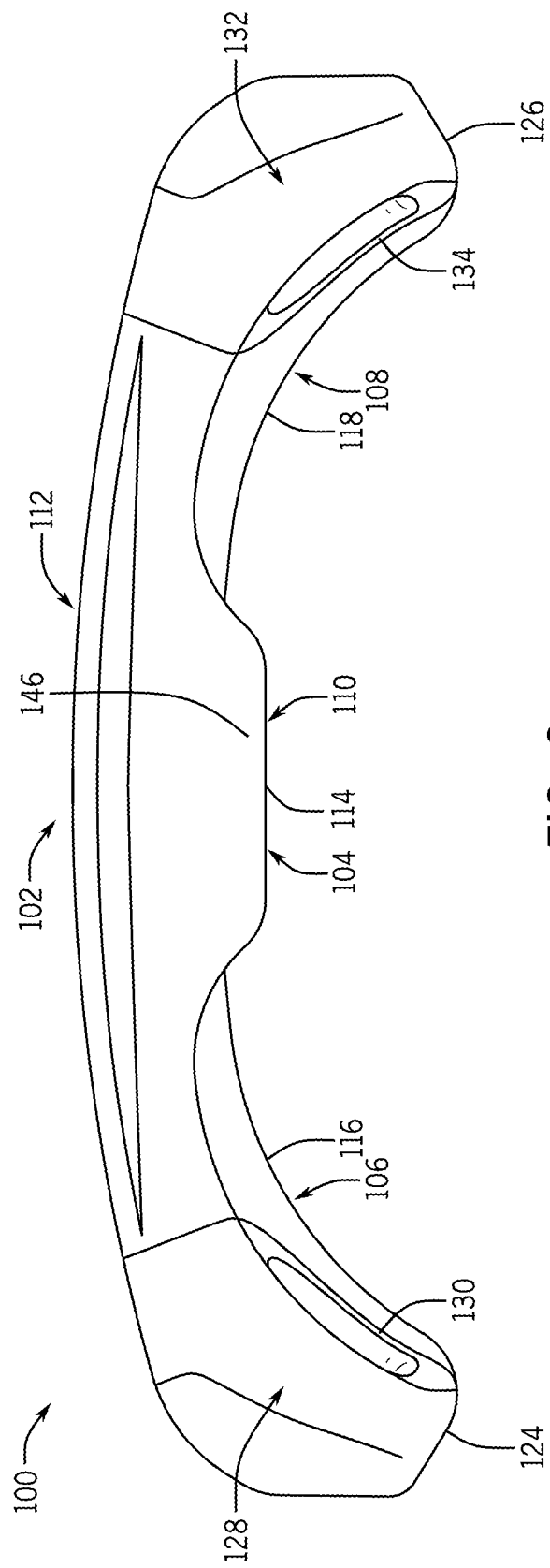
FIG. 2 is a top view of the back pad assembly of FIG. 1.
Figure 3:
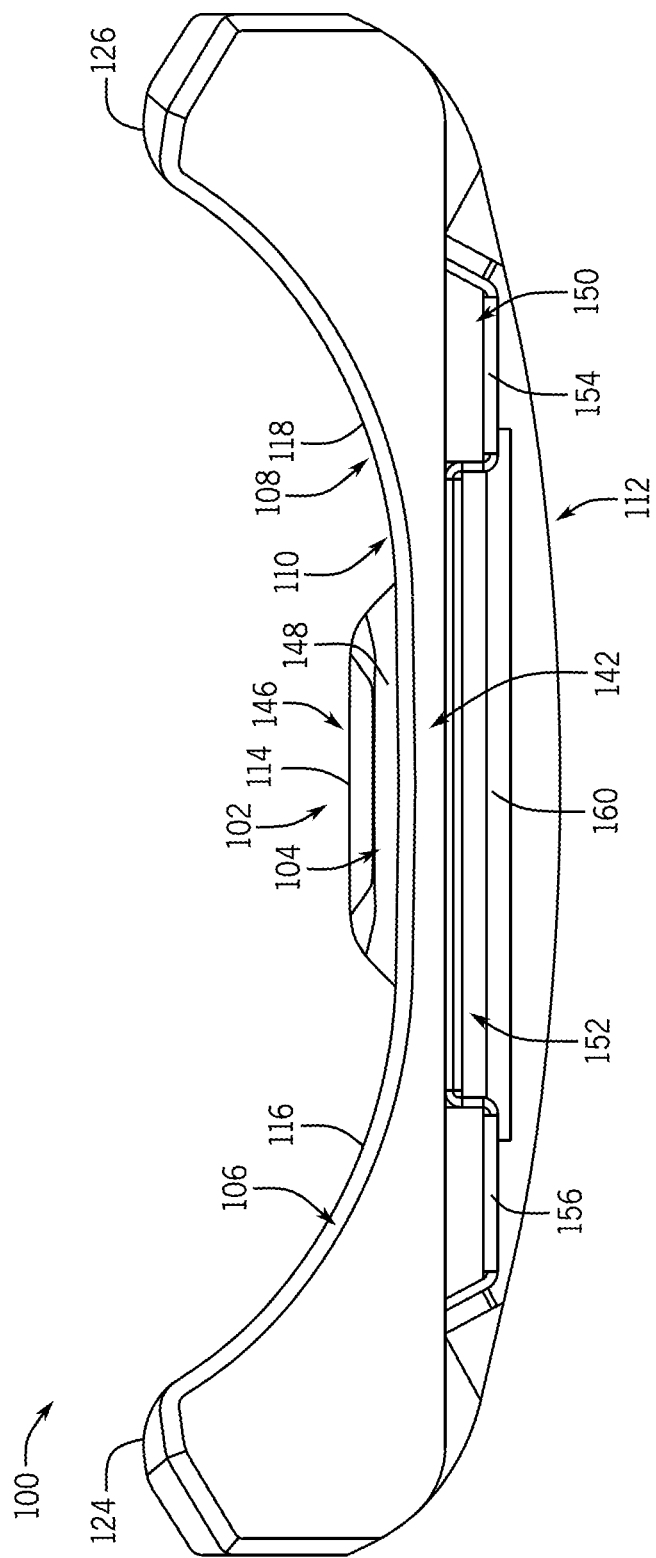
FIG. 3 is a bottom view of the back pad assembly of FIG. 1.
Figure 4:
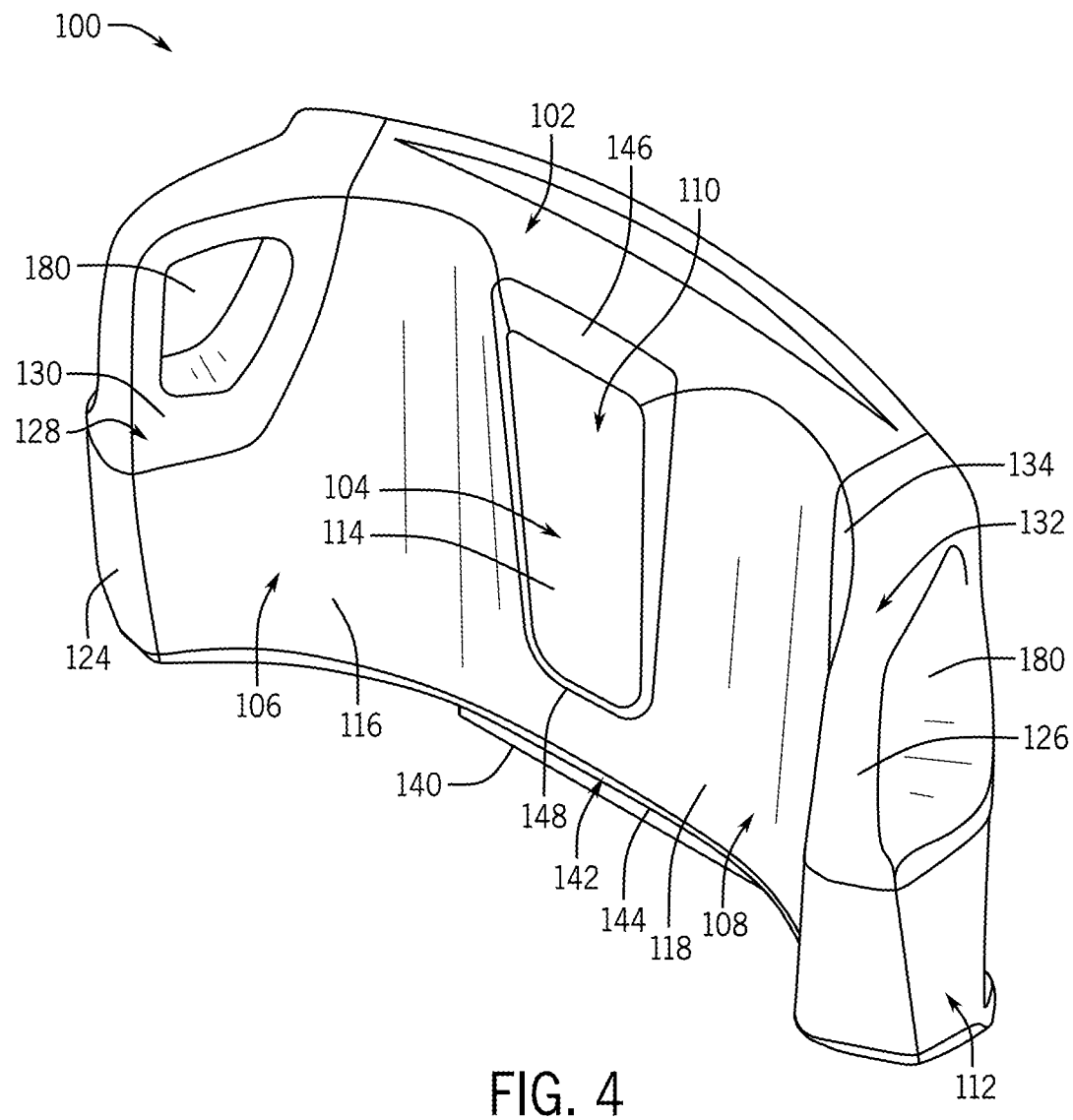
FIG. 4 is a top, front, left isometric view of the back pad assembly of FIG. 1.

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

It is also to be appreciated that material handling vehicles are designed in a variety of classes and configurations to perform a variety of tasks. It will be apparent to those of skill in the art that the present disclosure is not limited to any specific material handling vehicle, and can also be provided with various other types of material handling vehicle classes and configurations, including for example, lift trucks, forklift trucks, reach trucks, SWING REACH® vehicles, turret trucks, side loader trucks, counterbalanced lift trucks, pallet stacker trucks, order pickers, transtackers, and man-up trucks, and can be commonly found in warehouses, factories, shipping yards, and, generally, wherever pallets, large packages, or loads of goods can be required to be transported from place to place. The various systems and methods disclosed herein are suitable for any of operator controlled, pedestrian controlled, remotely controlled, and autonomously controlled material handling vehicles.

Material handling vehicles may require a back pad to provide comfort or support to an operator. Generally, the present disclosure provides a back pad assembly with an ergonomic design that allows an operator of a material handling vehicle to stand in a forward-facing stance or a side stance. Further, the back pad assembly of the present disclosure is height-adjustable to allow for modification of a back pad for an operator's comfort.

FIGS. 1-4 illustrate one non limiting example of a back pad assembly 100 that may include a back pad 102. In some non-limiting examples, the back pad 102 may be formed by an over molding process. For example, the back pad 102 may be formed by over molding a foam pad over a welded armature (not shown). The back pad 102 may include a center portion 104, a first side portion 106, and a second side portion 108. Further, the back pad 102 may include a front side or first side 110 and a rear side or second side 112. The center portion 104 may include a center surface 114 on the front side 110, the first side portion 106 may include a first lateral surface 116 on the front side 110, and the second side portion 108 may include a second lateral surface 118 on the front side 110. The first side portion 106 and the second side portion 108 may be arranged on laterally-opposing sides of the center portion 104. As such, the first lateral surface 116 and the second lateral surface 118 may be disposed on laterally-opposing sides of the center surface 114.

As illustrated in FIGS. 1-4, the first side portion 106 defines a generally curved shape or profile, and the second side portion 108 defines a generally curved shape or profile. For example, in the illustrated non-limiting example, the first side portion 106 may define a generally concave shape or profile, and the second side portion 108 may define a generally concave shape or profile. In some non-limiting examples, the first side portion 106 and the second side portion 108 may be reflections of one another about the center portion 104. The first side portion 106 may define a right outer edge or first outer edge 124, and the second side portion 108 may define a left outer edge or second outer edge 126. The first side portion 106 may extend laterally from the center portion 104 to the first outer edge 124, and the second side portion 108 may extend laterally from the center portion to the second outer edge 126.

A first side handle or first handle 128 may be coupled to the first side portion 106. The first handle 128 defines a first handle surface 130. A second side handle or second handle 132 may be coupled to the second side portion 108. The second side handle 132 defines a second handle surface 134. The first lateral surface 116 and the first handle surface 130 may combine to define a first curved portion or first side portion 106 of the back pad 102. That is, as shown advantageously in FIG. 2, the first lateral surface 116 and the first handle surface 130 may extend along a common curved shape or profile to define the curved shape or profile of the first side portion 106. Further, the second lateral surface 118 and the second handle surface 134 may combine to define a curved portion or second side portion 108 of the back pad 102. That is, the second lateral surface 118 and the second handle surface 134 may extend along a common curved shape or profile to define the curved shape or profile of the second side portion 108.

In some non-limiting examples, including as illustrated in FIGS. 1-4, the center portion 104 protrudes outward from the back pad 102. In the illustrated non-limiting example, the center surface 114 of the center portion 104 of the back pad 102 defines a substantially planar surface. In other non-limiting examples, the center surface 114 of the center portion 104 of the back pad 102 may define one or more curved surfaces. The center portion 104 may protrude outward such that a top central edge 146 of the center portion 104 extends out further from the back pad 102 than a bottom central edge 148 of the center portion 104. In other words, the center surface 114 may be angled relative to a plane extending parallel to the top central edge 146 and perpendicular to a ground on which a material handling vehicle travels.

Figure 5:
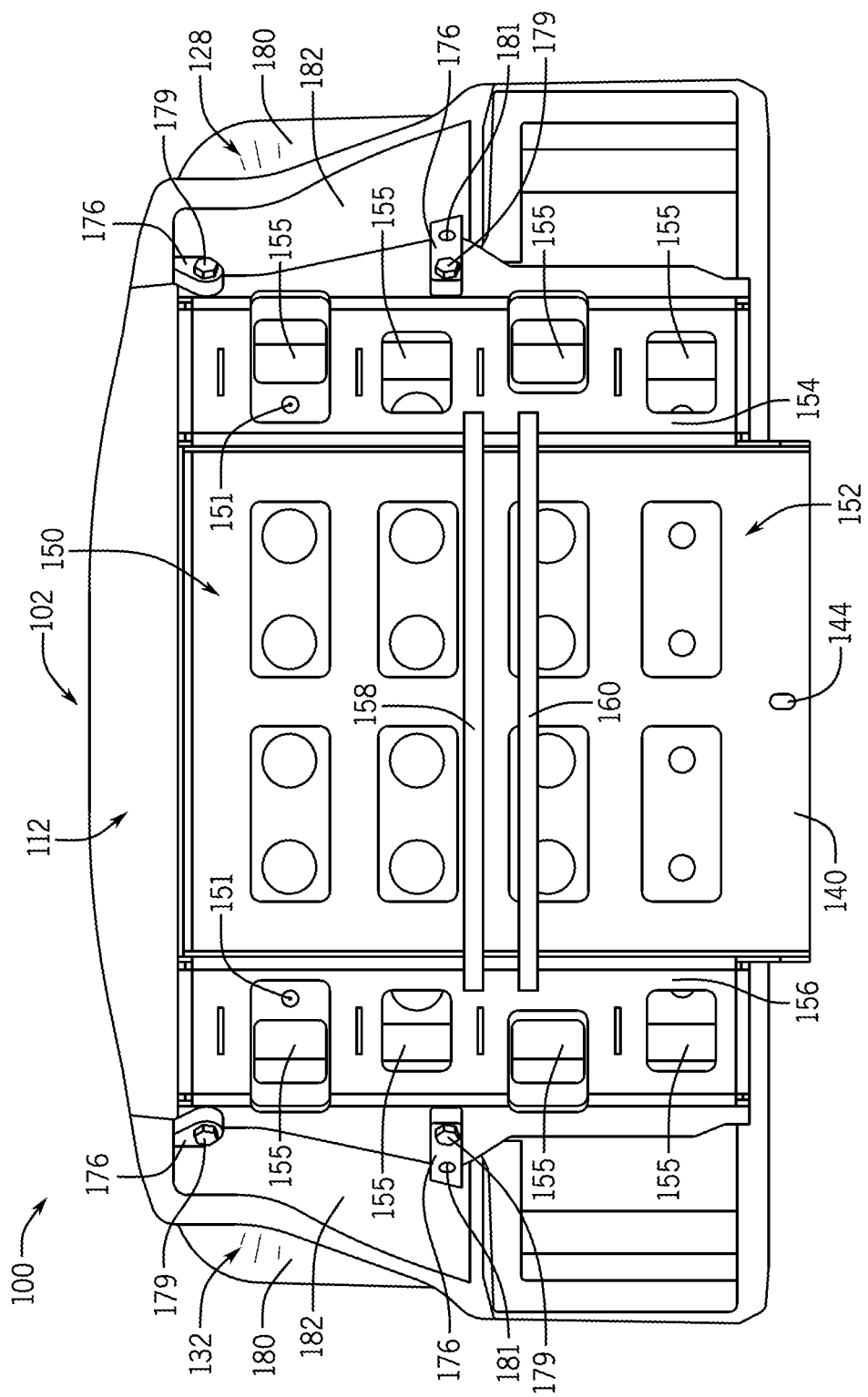
FIG. 5 is a rear view of the back pad assembly of FIG. 1.
Figure 6:
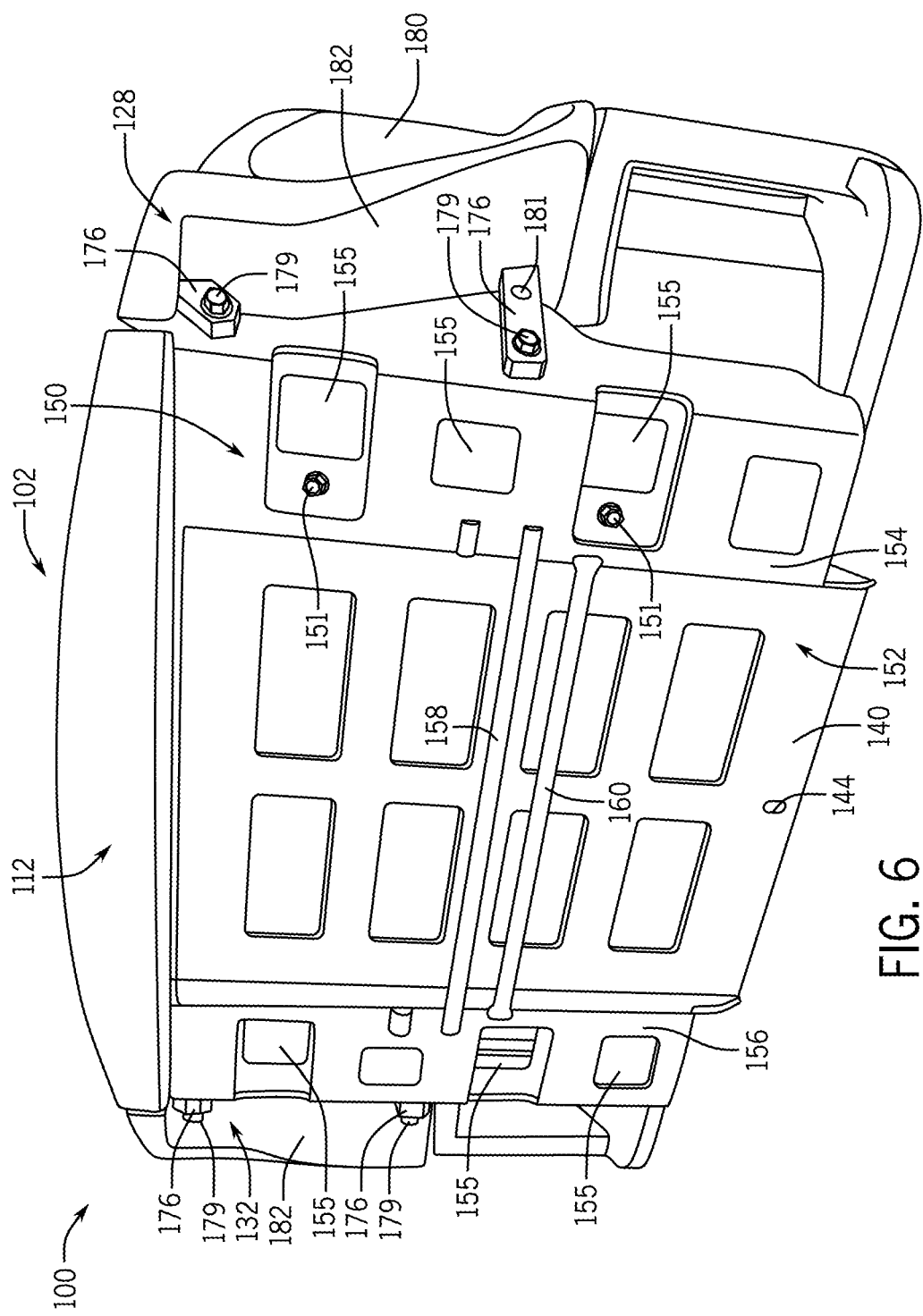
FIG. 6 is a top, rear, right isometric view of the back pad assembly of FIG. 1.

Turning to FIGS. 5 and 6, the back pad assembly 100 may include a framework 150 coupled to the back pad 102. The framework 150 may be attached to the rear side or second side 112 of the back pad 102. The framework 150 may be attached to the back pad 102 via at least one back fastening element or a plurality of back fastening elements 151 (e.g., one or more bolts, or screws). The framework 150 may include a central recessed region 152 that is generally rectangular in shape. The framework 150 may include a first rear wall 154 and a second rear wall 156 that may be arranged on laterally-opposing sides of the central recessed region 152. The first and second rear walls 154, 156 may extend vertically along the rear side 112. Further, the first and second rear walls 154, 156 may include a plurality of vertically spaced apertures or cutouts 155 that extend therethrough. The first and second rear walls 154, 156 may be configured to receive the fastening elements 151 that attach the first and second rear walls 154, 156 to the back pad 102. The central recessed region 152 may be recessed relative to the first and second rear walls 154, 156 to provide a gap for the mounting frame 162 to extend within.

A flange 140 may extend from the framework 150 to below a bottom end 142 of the back pad 102 (e.g., in a direction away from the top central edge 146). The flange 140 may be centrally located along the bottom end 142 of the back pad 102. Further, the flange 140 may include a mounting aperture 144. The mounting aperture 144 may be any size or shape and is configured to receive a fastening element therethrough.

The framework 150 may include at least a first mounting bar 158 and a second mounting bar 160. The first mounting bar 158 and the second mounting bar 160 may define cylinders, or rectangular prisms, or any other shape. The first mounting bar 158 and the second mounting bar 160 may be vertically spaced apart and may be coupled to a mounting frame 162 (see FIGS. 7, 8A and 8B). Each of the first mounting bar 158 and the second mounting bar 160 may extend laterally across the central recessed region 152 the framework 150. The first and second mounting bars 158, 160 extend laterally from the first rear wall 154 to the second rear wall 156.

Figure 8A:
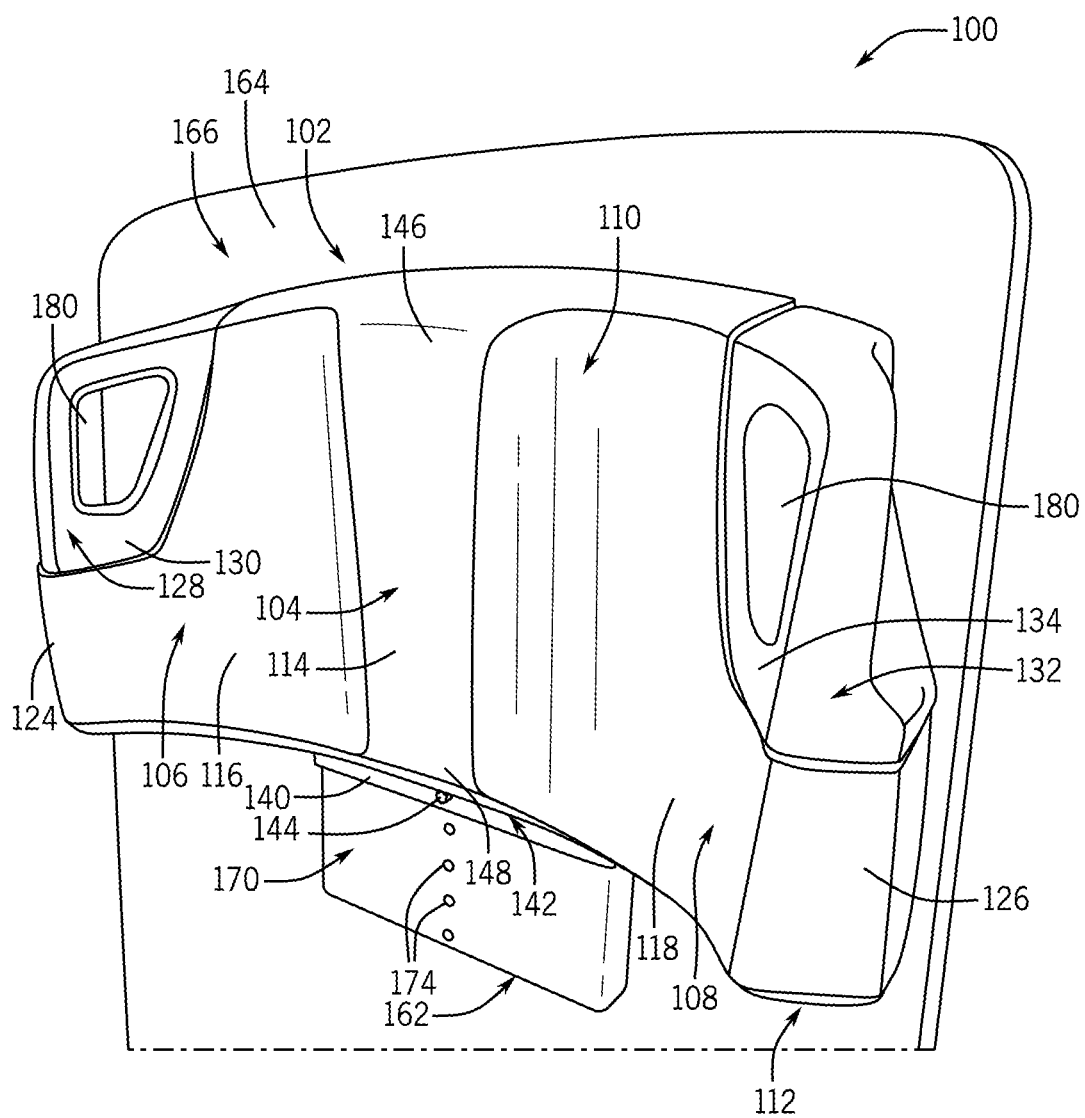
FIG. 8A is a top, front, right isometric view of the back pad assembly of FIG. 1 mounted to the mounting frame of FIG. 7.
Figure 8B:
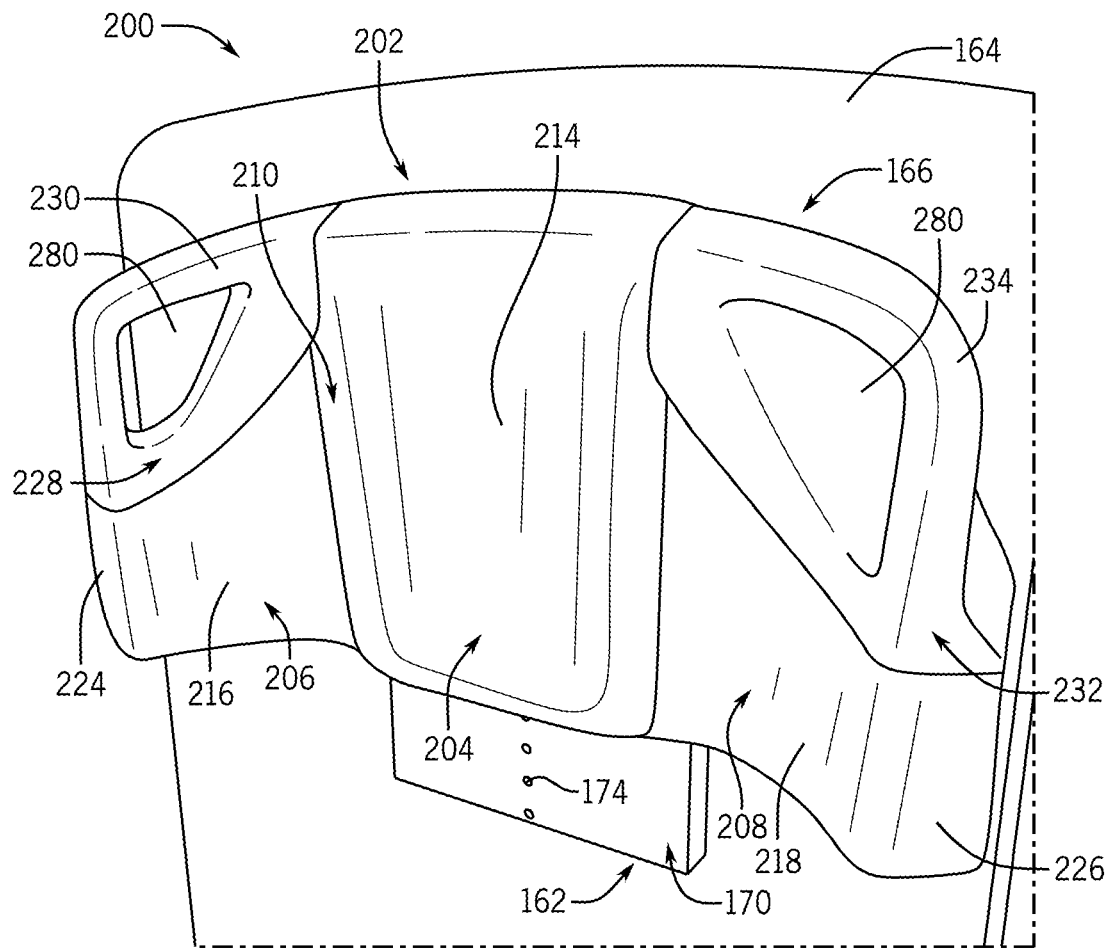
FIG. 8B is a top, front, right isometric view of an embodiment of a back pad assembly, according to some aspects of this disclosure, mounted to the mounting frame of FIG. 7.

FIGS. 7, 8A, and 8B illustrates the mounting frame 162 fixed to a back rest 164 of a material handling vehicle 166. The mounting frame 162 may include a notched section 168 and an attachment section 170. The notched section 168 may be arranged vertically above (e.g., in a direction away from a floor on which the material handling vehicle 166 travels) the attachment section 170. As shown in FIG. 7, the notched section 168 may include a plurality of vertically spaced notches 172. While the illustrated non-limiting example may include six laterally-opposed pairs of vertically spaced notches 172, in other non-limiting examples there may be more or less vertically spaced notches 172. Further, while the plurality of vertically spaced notches 172 in the illustrated example may be shaped to receive first and second mounting bars 158, 160 that are cylindrical in shape, in other non-limiting examples the plurality of vertical notches 172 may be shaped to receive first and second mounting bars 158, 160 that are prismatic, or polygonal, in shape. Each of the first mounting bar 158 and the second mounting bar 160 may be configured to be received within a vertically-aligned pair of notches 172. The back pad 102 and the framework 150 may be selectively displaced vertically to arrange the first and second mounting bars 158, 160 in a desired pair of the notches 172 on the mounting frame 162 to set a height of the back pad 102. The mounting frame 162 provides the back pad assembly 100 with a plurality of discrete adjustable heights. Further, in non-limiting examples where there may be more vertically spaced notches 172, the mounting frame 162 provides more adjustability to an operator for configuring a height of the back pad assembly 100. In some non-limiting examples, only three vertically-spaced notches can be provided, allowing the back pad to be adjusted between only two heights, which can accommodate operators having a wide range of heights.

FIG. 8A illustrates the back pad 102 and the framework 150 mounted to the mounting frame 162. The attachment section 170 of the mounting frame 162 may include a plurality of attachment apertures 174. The attachment apertures 174 may be vertically spaced apart and may be threaded. A fastening element (e.g., a screw or bolt) may be threaded through the mounting aperture 144 on the framework 150 and into the attachment apertures 174 on the attachment section 170 to secure the framework 150, and thereby the back pad 102, at a desired height on the back rest 164. The attachment section 170 may include any number of attachment apertures 174.

In other embodiments, a different back pad can be mounted to a mounting framework of a material handling vehicle. For example, FIG. 8B illustrates a back pad 202 mounted to the framework 150. As illustrated, the back pad 202 can be generally similar to the back pad 102 and includes similar numbering for similar features. The back pad 202 can thus include a center portion 204, a first side portion 206, and a second side portion 208. The center portion 204 may include a center surface 214, the first side portion 206 may include a first lateral surface 216, and the second side portion 208 may include a second lateral surface 218. The first side portion 206 and the second side portion 208 may be arranged on laterally-opposing sides of the center portion 204. As such, the first lateral surface 216 and the second lateral surface 218 may be disposed on laterally-opposing sides of the center surface 214.

As illustrated in FIG. 8B, the first and second side portions 206, 208 can each define a generally concave shape or profile. Each of the first and second side portions 206, 208 can be a reflection of the other side portion 206, 208 about the center portion 204. The first side portion 206 may define a right outer edge or first outer edge 224, and the second side portion 208 may define a left outer edge or second outer edge 226. The first side portion 206 may extend laterally from the center portion 204 to the first outer edge 224, and the second side portion 208 may extend laterally from the center portion to the second outer edge 226.

A first side handle or first handle 228 may be coupled to the first side portion 206. The first handle 228 defines a first handle surface 230. A second side handle or second handle 232 may be coupled to the second side portion 208. The second side handle 232 defines a second handle surface 234. The first lateral surface 216 and the first handle surface 230 may combine to define a first curved portion or first side portion 206 of the back pad 202. Further, the second lateral surface 218 and the second handle surface 234 may combine to define a curved portion or second side portion 208 of the back pad 202. In the illustrated embodiment, the first handle 228 extends across a width of the first side portion 206 from the center portion 204 to the first outer edge 224, and the second handle 232 extends across a width of the second side portion 208, from the center portion 204 to the second outer edge 226. Each of the first and second handles 228, 232 can define a handle aperture 280, which can receive, or partially receive, a hand of an operator while gripping the respective handle surface 230, 234. The first and second handle surfaces 230, 234 can define a curved profile, and can further have a diameter that can allow an operator of the material handling vehicle to grip the handle 228, 232.

In the illustrated non-limiting example of FIG. 8B, the center portion 204 protrudes outward from the back pad 202. In the illustrated non-limiting example, the center surface 214 of the center portion 204 of the back pad 202 defines a concave profile, as could advantageously support the back of an operator in some operating positions and configurations.

Figure 9:
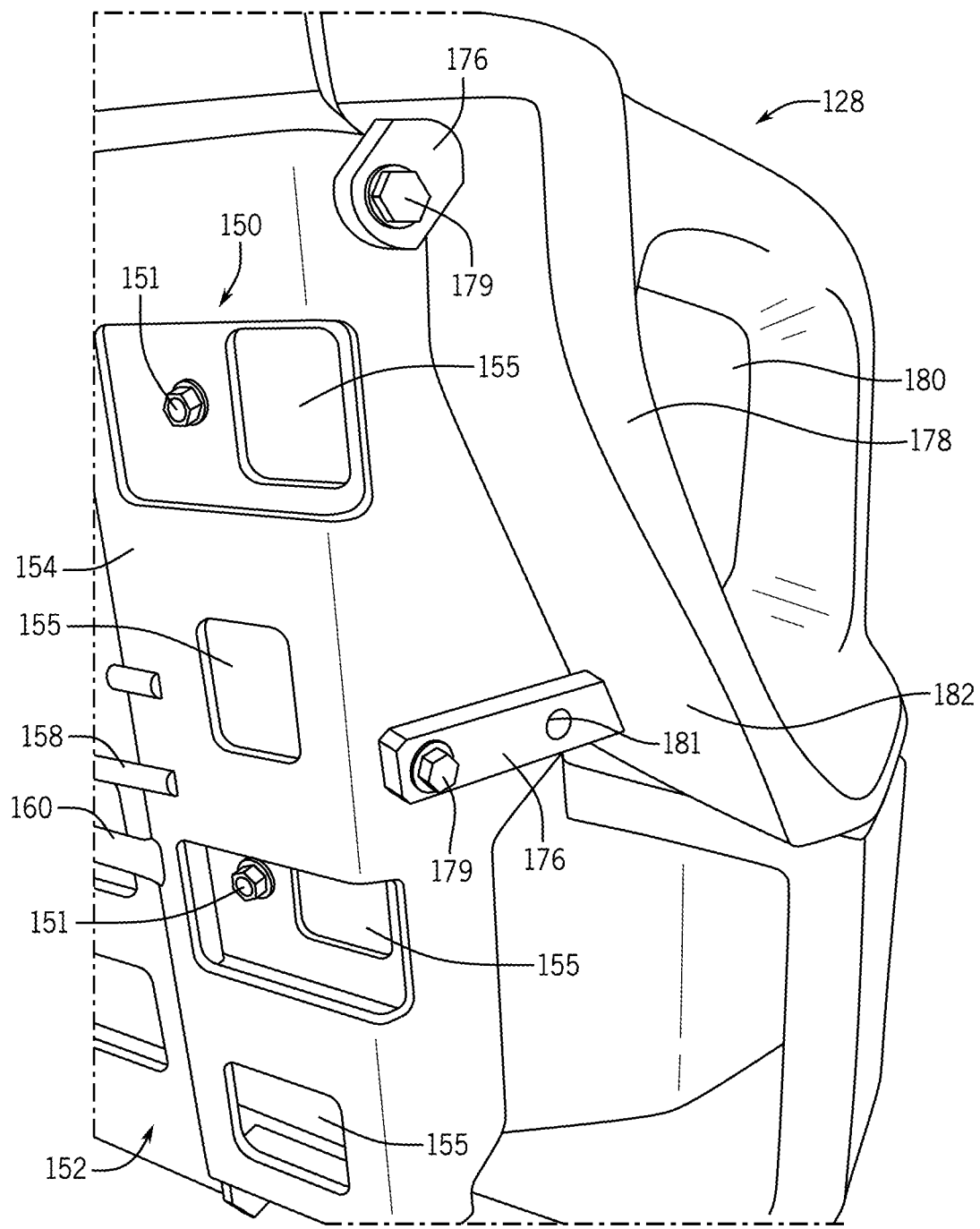
FIG. 9 is an enlarged view of a handle attached to the back pad assembly of FIG. 6.

Side handles of a back pad for a material handling vehicle may experience more direct contact with a user than a body of the back pad, and it can thus be advantageous to provide systems for removing side handles from a back pad, allowing the side handles to be independently replaced without the need to simultaneously replace the entire back pad. Referring now to FIG. 9, the first and second side handles 128, 132 of the back pad assembly 100 each may include arms 176 that are vertically spaced from one another and that extend from a rear handle surface 178 of the first and second side handles 128, 132. The rear handle surface 178 may be arranged on the rear side 112 of the back pad 102. A fastening element 179 (e.g., a screw or bolt) may be installed through the arms 176 and into the framework 150 to couple the first and second side handles 128, 132 to the framework 150. The first and second side handles 128, 132 may be removably coupled to the back pad 102 via selective installation and removal of the fastening elements 179, thus allowing for independent replacement or maintenance of the first and second side handles 128, 132, without the need for a corresponding replacement of the back pad 102.

Figure 17A:
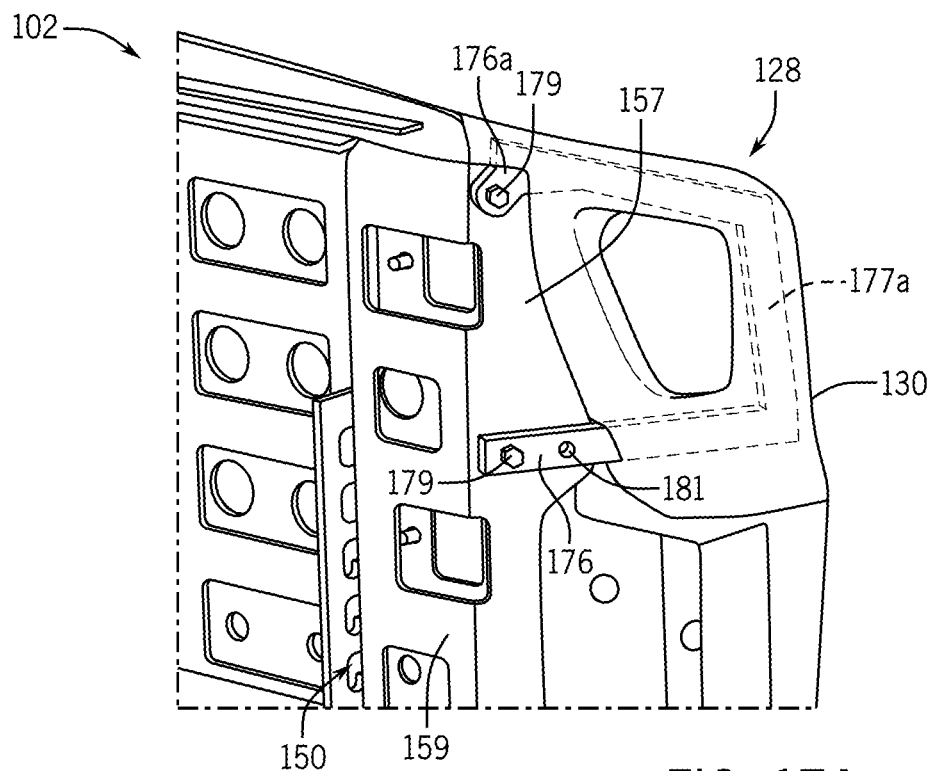
FIG. 17A is a partial top, rear, right isometric view of the back pad assembly of FIG. 1, showing an embodiment of a bracket for a handle of the back pad assembly.
Figure 17B:
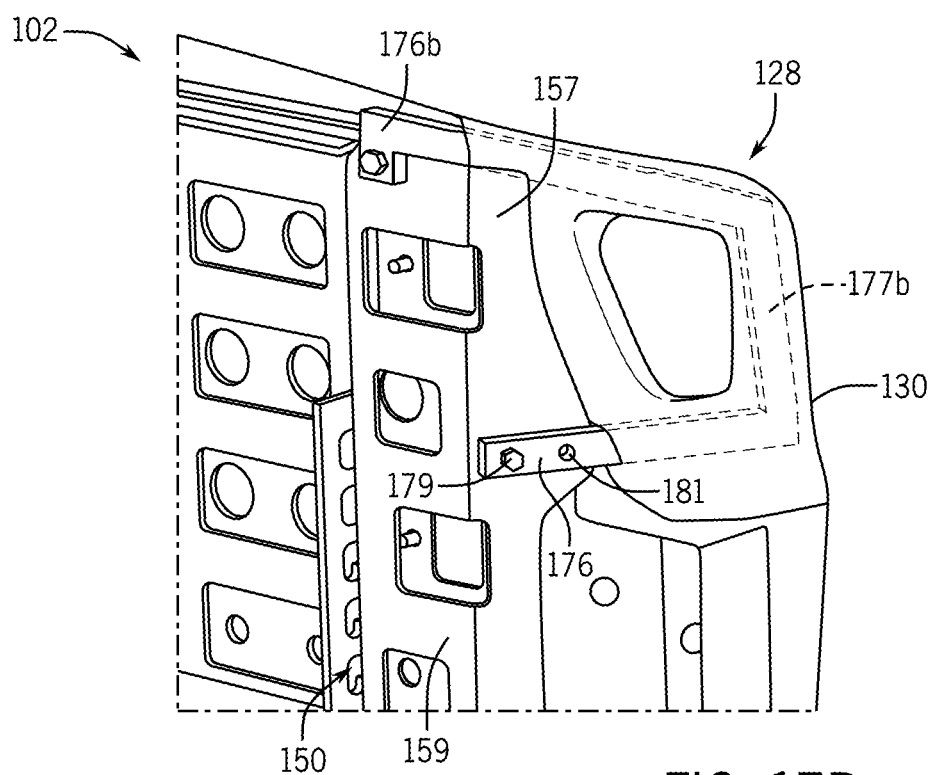
FIG. 17B is a partial top, rear, right isometric view of the back pad assembly of FIG. 1, showing another embodiment of a bracket for a handle of the back pad assembly.

Arms for connecting a side handle of a back pad to a framework can be integrally formed with a handle bracket, which can provide structure and durability to a side handle. In this regard, FIGS. 17A and 17B illustrate non-limiting examples of a back pad 102 including handle brackets 177a, 177b. As shown in FIG. 17A, a first handle bracket 177a can be provided, which can provide internal structure to the first side handle 128. The first handle bracket 177a can define a generally U-shaped profile, as can approximately match a curved profile of the handle surface 130. Arms 176a, 176 of the first handle bracket 177a can extend outwardly from the first side handle 128 and can include one or more apertures 181 for receiving corresponding fastening elements 179. In the illustrated embodiment (as also illustrated in FIGS. 6 and 9), the arms 176a, 176 of the first handle bracket 177a are substantially parallel to each other and are both configured to be fastened to a first planar surface 157 of the framework 150. FIG. 17B, illustrates another non-limiting example, showing a second handle bracket 177b, having a first arm 176b which can be longer than a second arm 176, the second arm being identical to the second arm 176 of the first handle bracket 177a. Further, as shown, the arms 176b, 176 of the bracket 177b are not parallel, and the first arm 176b can be configured to secure the bracket 177b (and thus the first handle 128) to a second planar surface 159 of the framework 150, the second planar surface 159 being disposed at an angle relative to the first planar surface 157. The second arm 176 can be configured to secure the bracket 177b (and thus the first handle 128) to the first planar surface 157.

Figure 18:
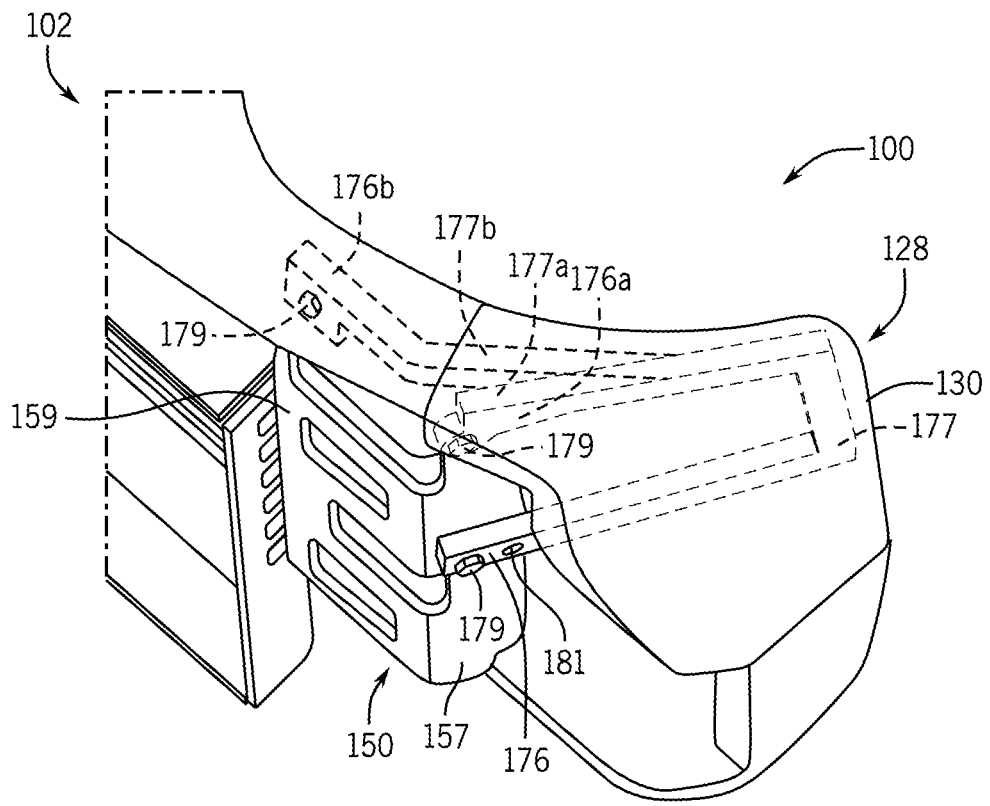
FIG. 18 is a partial top, rear, right isometric view of the back pad assembly of FIG. 1, showing an overlay of the bracket of FIG. 17A and the bracket of FIG. 17B.
Figure 19:
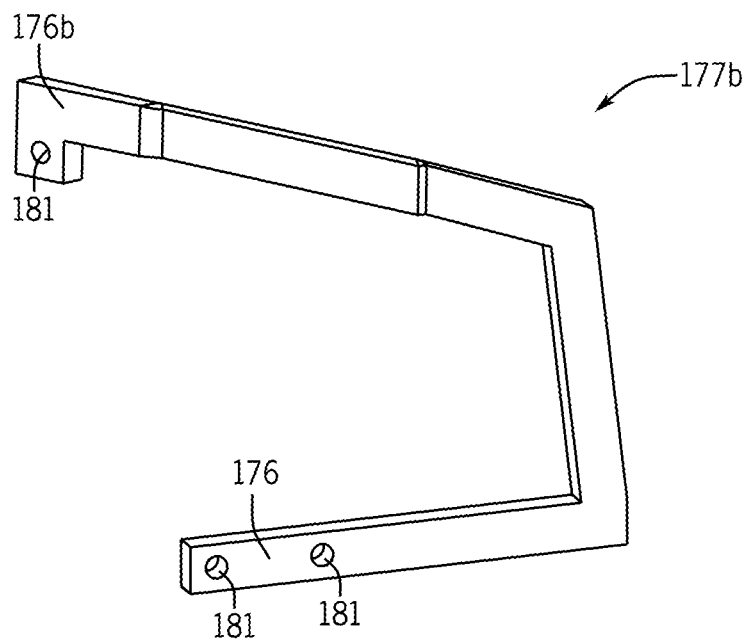
FIG. 19 is an isometric view of the bracket of FIG. 17B for the handle assembly.

FIG. 18 illustrates an overlay of the first handle bracket 177a and the second handle bracket 177b. As shown, the brackets 177a, 177b can be substantially similar, having a similar U-shaped profile, and second arms 176. As shown, the first arm 176b can extend further along the framework 150 than the first arm 176a of the first bracket 177a. The first arm 176a of the second bracket 177b can further include one or multiple bends which can allow the second bracket 177b to match a profile of the corresponding surface 130 of the first handle 128, while also positioning the first arm 176b to be fastened to the second planar surface 159. While the brackets 177a, 177b have been described with respect to the first handle 128, one of skill in the art will appreciate that handle brackets, similar to, identical to, or being a mirror image of handle brackets 177a, 177b can be provided for any of the handles 128, 132, 228, 232 described herein, or other embodiments of a handle for a back pad assembly. The bracket 177b, further illustrated in FIG. 19, can be particularly advantageous for use with the handles 228, 232 of the back pad assembly 200, as the brackets can provide support for a handle having a longer profile, and can allow the handles 228, 232 to extend across the width of respective side portions 106, 108. The brackets 177a, 177b, can thus provide additional rigidity and structure for handles of a back-pad assembly, and can advantageously accommodate handles having different configurations, or defining different handle apertures 180, 280.

Figure 11:
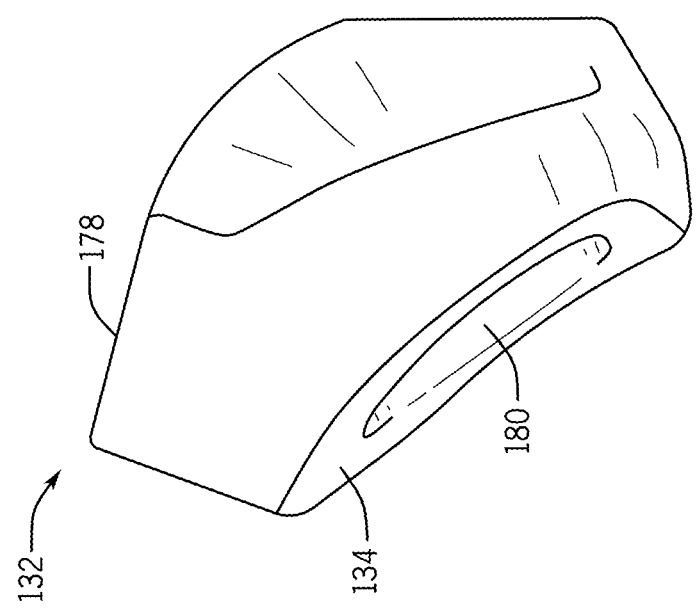
FIG. 11 is a top view of the handle of FIG. 10.
Figure 10:
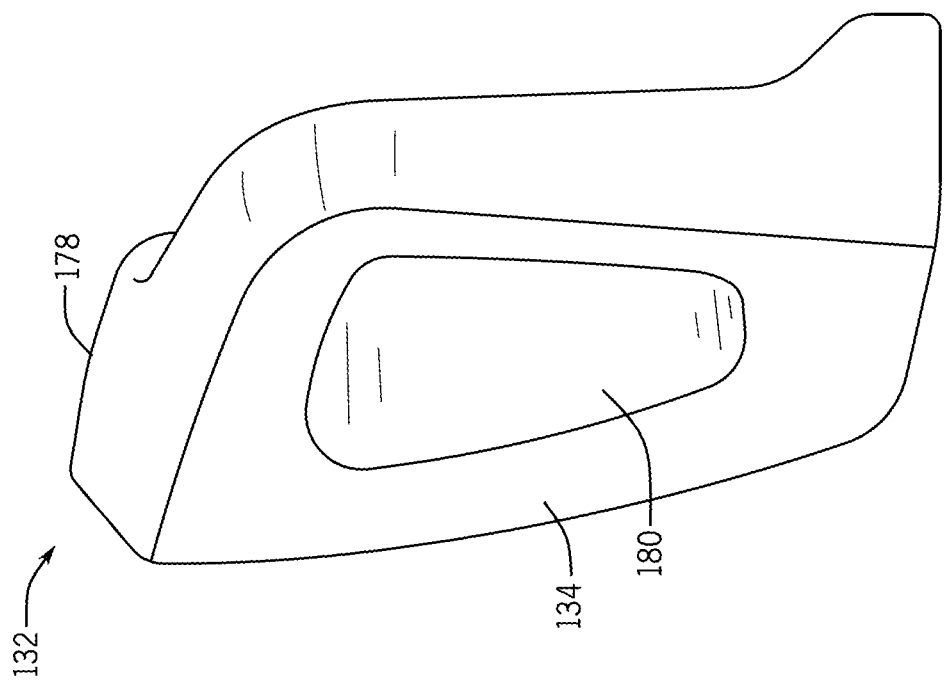
FIG. 10 is a front view of a handle of the back pad assembly of FIG. 1.
Figure 13:
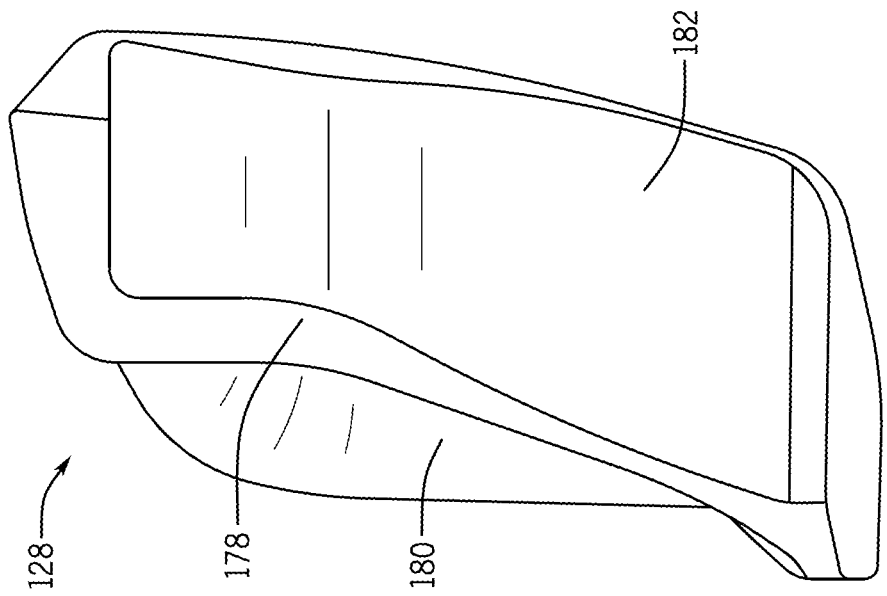
FIG. 13 is a right side view of another handle of the back pad assembly of FIG. 1.
Figure 12:
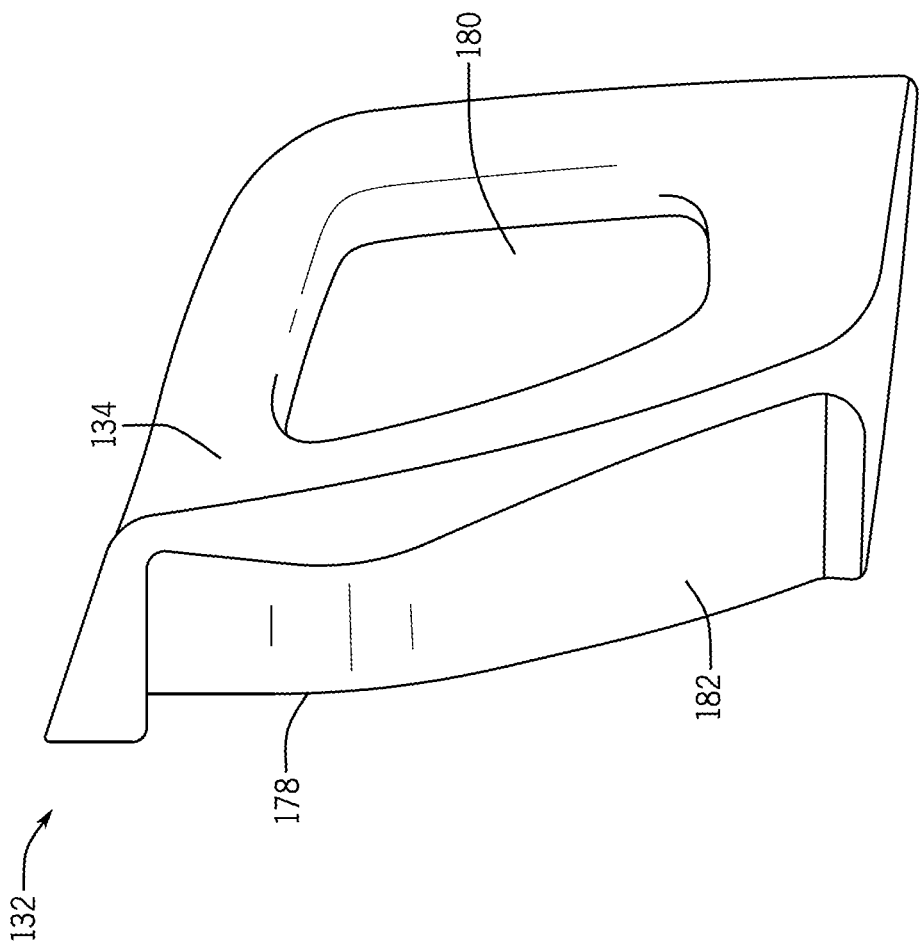
FIG. 12 is a left side view of the handle of FIG. 10.

As shown in FIGS. 10-12, the second side handle 132 is illustrated in further detail. The second side handle 132 is similar to the first handle 128 (see FIG. 1), with like features identified using the same reference numerals, except that the second side handle 132 is a mirror image of the first handle 128. The second handle surface 134 defines a generally curved shape or profile. For example, in the illustrated non-limiting example, the second handle surface 134 may define a generally concave shape or profile that continues the general concave shape or profile of the second lateral surface 118. The second handle surface 134 and the second lateral surface 118 may combine to form the generally curved profile of the second curved portion 108. The second side handle 132 may include a hole or a handle aperture 180 that extends therethrough. The aperture 180 may be configured to receive a hand of an operator (not shown). Further, the second handle surface may include a mating surface or notch or recessed handle surface 182 that extends from the rear handle surface 178. The mating surface 182 is configured to receive the framework 150 (see FIG. 9). Further, and as shown in the illustrated non-limiting example, the mating surface 182 may be dimensioned to conform to a shape defined by the framework 150. FIG. 13 illustrates the first side handle 128, which, as shown, includes the same features as the second side handle 132, including the mating surface 182, and the rear handle surface 178.

Figure 14:
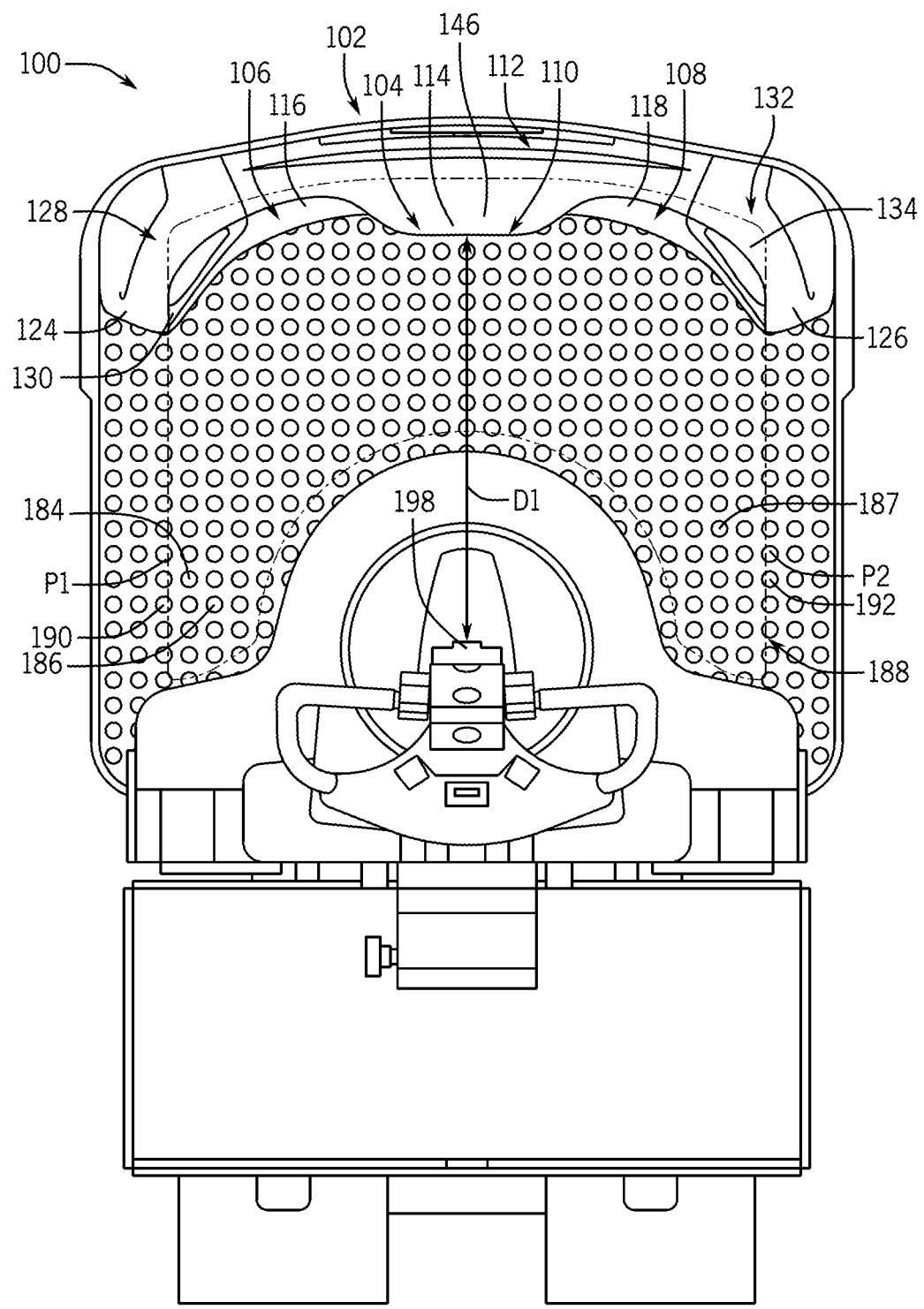
FIG. 14 is a top view of the back pad assembly of FIG. 1 attached to a material handling vehicle according to an aspect of the present disclosure.

Referring now to FIG. 14, the material handling vehicle 166 may include an operator compartment 184 that defines an active zone 186. The active zone 186 may be where an operator stands on an operator platform 187 to operate the material handling vehicle 166. The active zone 186 may include a perimeter 188 with a right perimeter side or first perimeter side 190 and a left perimeter side or second perimeter side 192. The first perimeter side 190 may define a first vertical plane P1 that extends perpendicularly from the operator platform 187. The first vertical plane P1 may intersect the first outer edge 124 of the first side portion 106. The second perimeter side 192 may define a second vertical plane P2 that extends perpendicularly from the operator platform 187. The second vertical plane P2 may intersect the second outer edge 126 of the second side portion 108.

The center portion 104 formed in the back pad 102 can urge an operator towards a control handle 198 on the material handling vehicle 166 during a forward motion of travel. A compartment length D1 may be measured from the center surface 114 to the control handle 198. The compartment length D1 may be any distance depending on how far the center portion 104 protrudes from the back pad 102. The first and second curved portions 106, 108 formed in the back pad 102 allow an operator to operate the material handling vehicle 166 in a side stance when operating the material handling vehicle 166 in a non-forward motion of travel. Therefore, the operator may stand in at least three operating configurations in the active zone with the ergonomic design of the back pad assembly 100 of the present disclosure: a forward standing configuration, a first side-stance configuration, or a second side-stance configuration. Additionally, the first and second side handles 128, 132 can provide additional support to an operator in a side stance position. In the first and second side-stance configuration, a side of the operator can be at least partially received in one of the first lateral surface 116, or second lateral surface 118, and the operator can grasp the handle 128, 132 opposite the surface in which the operator's side is received. Further, the back pad 102 can be spaced at a height to allow an arm of the operator to rest on a top of the center portion 104 of the back pad 102 when the operator is in the first or second side stance. Accordingly, in some non-limiting examples, the vertically spaced notches 172 can be positioned to allow the back pad to be set to a height with the top central edge 146 of the back pad at about 40 to about 45 inches, the top central edge 146 of the back pad being about 1000 millimeters to about 1150 millimeters above the operator platform 187.

Figure 15:
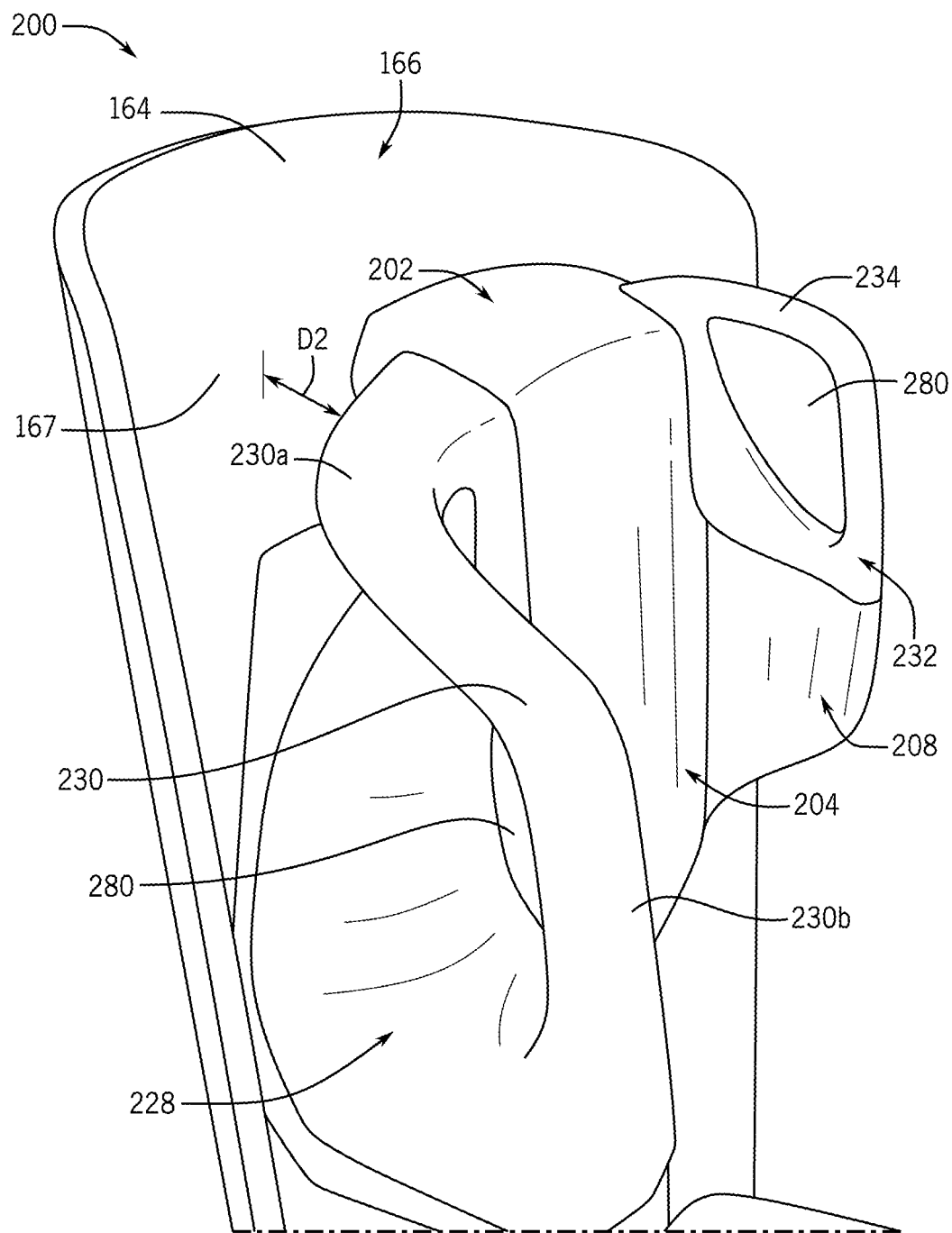
FIG. 15 is a top, front, left view of the back pad assembly of FIG. 8B.

In some non-limiting examples, handles of a back pad can provide multiple grip configurations for an operator of a material handling vehicle. For example, FIG. 15 illustrates the back pad assembly 200, showing back pad 202 mounted to a back rest 164 of the material handling vehicle 166. The back rest has a surface 167 facing generally toward the back pad 202. As shown, the first handle surface 230 of the first handle 228 has a horizontal gripping portion 230*a* which extends in a horizontal direction (e.g., approximately parallel to the operator platform 187 illustrated in FIG. 14). The first handle surface 230 further has a vertical gripping portion 230*b*, which extends in a generally vertical direction. The horizontal gripping portion 230*a* and the vertical gripping portion 230*b* can thus provide different grip configurations for an operator. The horizontal gripping portion 230*a* can be positioned closer to the second side portion 208 than the vertical gripping portion 230*b* and can therefore provide a gripping location for an operator standing in a side-stance in the second side portion 208. Additionally, the horizontal gripping portion 230*a* can provide a gripping location for an operator whose arm is resting above the back pad 202. Further, the horizontal portion can be spaced apart from the surface 167 of the back rest 164 by a distance D2. The distance D2 can be a distance that is configured to allow an operator's hand to be at least partially received between the horizontal portion 230*a* and the back rest 164. An operator could thus place their hand into the space between the back rest 164 and the horizontal gripping portion 230*a*, with their fingers extending through the aperture 280 to grip the handle 228 in the horizontal gripping configuration. It should be appreciated that the above disclosure can apply equally to the second handle 232, which can be a mirror of the first handle 228 and can thus include multiple portions of the second handle surface 234 allowing for multiple different gripping configurations for an operator.

Figure 16:
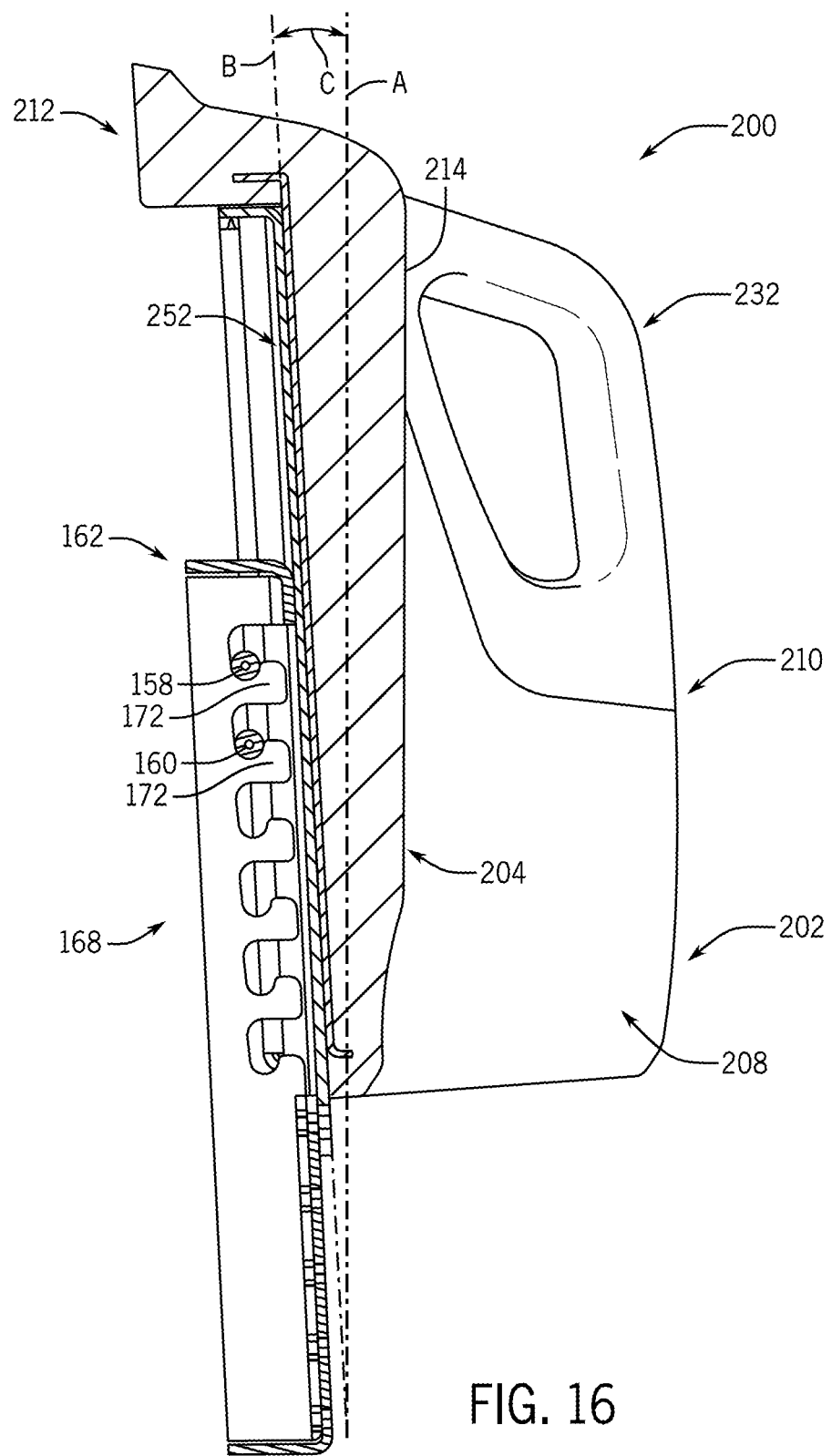
FIG. 16 is a cross-sectional left elevation view of the back pad assembly of FIG. 8B mounted to the mounting frame of FIG. 7.

A back pad assembly for a material handling vehicle can be positioned at an angle, relative to a vertical axis. For example, FIG. 16 illustrates the back pad assembly 200, and a vertical axis A. An installation axis B of the back pad assembly can be parallel to a planar surface of a central recessed region 252 of the back pad assembly. As shown, an angle C is defined between the axis B and the vertical axis A, and the back pad assembly may thus allow an operator to recline slightly against the back pad 202 during operation of the material handling vehicle 166 (see FIG. 15). In other embodiments, the axis B can be defined as an axis parallel to an elongate direction of the mounting frame 162, or a surface thereof.

Within this specification aspects of the present disclosure have been described in a way which enables a clear and concise specification to be written, but it is intended and will be appreciated that aspects of the present disclosure may be variously combined or separated without parting from the invention. For example, it will be appreciated that all preferred features described herein are applicable to all aspects of the invention described herein.

Thus, while the invention has been described in connection with particular aspects and examples, the invention is not necessarily so limited, and that numerous other aspects, examples, uses, modifications and departures from the aspects, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A back pad assembly for a material handling vehicle, the back pad assembly comprising:
a back pad including a center portion, a first side portion, and a second side portion, wherein the first side portion defines a first curved profile and the second side portion defines a second curved profile, the first curved profile and the second curved profile being arranged on laterally-opposing sides of the center portion;
a framework including a first mounting bar and a second mounting bar, wherein the framework is coupled to the back pad; and
a mounting frame,
wherein the first and second mounting bars are adjustably supported by the mounting frame to enable the back pad to be selectively mounted at varying heights along the mounting frame.

2. The back pad assembly of claim 1, wherein the back pad is formed by over molding a foam pad.

3. The back pad assembly of claim 1, wherein the back pad includes at least one side handle coupled to the back pad.

4. The back pad assembly of claim 3, wherein the at least one side handle is removably coupled to the framework.

5. The material handling vehicle of claim 4, wherein the at least one side handle comprises a bracket having a first arm and a second arm, wherein the first arm and the second arm are configured to be secured to at least a first planar surface of the framework to couple the at least one side handle to the back pad.

6. The material handling vehicle of claim 5, wherein the first arm is configured to be secured to a second planar surface of the framework, the second planar surface being positioned at an angle relative to the first planar surface.

7. The material handling vehicle of claim 3, wherein the at least one side handle includes a vertical gripping portion and a horizontal gripping portion.

8. A material handling vehicle comprising:
an operator compartment that defines an active zone with a perimeter;
a back rest;
a back pad, the back pad including a first side portion and a second side portion with generally curved profiles arranged on laterally-opposing sides of a center portion; and
a framework including a first mounting bar and a second mounting bar, wherein the framework is coupled to the back pad,
wherein the center portion protrudes from the back pad toward a control handle of the material handling vehicle,
wherein a first side of the perimeter defines a first vertical plane that intersects a first outer edge of the first side portion, and wherein a second side of the perimeter defines a second vertical plane that intersects a second outer edge of the second side portion.

9. The material handling vehicle of claim 8, wherein the back rest includes a mounting frame, and the back pad is mounted to the mounting frame.

10. The material handling vehicle of claim 9, wherein the mounting frame includes a notched section that includes a plurality of vertically spaced notches.

11. The material handling vehicle of claim 10, wherein the mounting frame further includes an attachment section with a plurality of vertically spaced threaded apertures.

12. The material handling vehicle of claim 8, wherein the back pad includes at least one side handle coupled to the back pad.

13. The material handling vehicle of claim 12, wherein the at least one side handle is removably coupled to the framework.

14. A material handling vehicle comprising:
   a back pad including a center surface, a first lateral surface, and a second lateral surface, wherein the first lateral surface and the second lateral surface are disposed on laterally opposing sides of the center surface;
   a first handle coupled to a first side of the back pad and defining a first handle surface; and
   a second handle coupled to a second side of the back pad and defining a second handle surface,
   wherein the first lateral surface and the first handle surface combine to define a first curved portion of the back pad, and
   wherein the second lateral surface and the second handle surface combine to define a second curved portion of the back pad.

15. The material handling vehicle of claim 14, further comprising a framework including a first mounting bar and a second mounting bar, wherein the framework is coupled to the back pad.

16. The material handling vehicle of claim 15, further comprising a mounting frame, wherein the first and second mounting bars are adjustably supported by the mounting frame to enable the back pad to be selectively mounted at varying heights along the mounting frame.

17. The material handling vehicle of claim 15, wherein the first handle and the second handle are removably coupled to the framework.

18. The material handling vehicle of claim 17, wherein the first handle and the second handle include a notch in a rear of the first handle and the second handle, the notch being configured to receive the framework.

19. The material handling vehicle of claim 17, wherein the mounting frame includes a notched section that includes a plurality of vertically spaced notches.

20. The material handling vehicle of claim 14, wherein the first handle includes a vertical gripping portion and a horizontal gripping portion.

\* \* \* \* \*